US010635725B2

United States Patent
Samdani et al.

(10) Patent No.: US 10,635,725 B2
(45) Date of Patent: Apr. 28, 2020

(54) PROVIDING APP STORE SEARCH RESULTS

(71) Applicant: Google LLC, Mountain View, CA (US)

(72) Inventors: Rajhans Samdani, Mountain View, CA (US); Amarnag Subramanya, Sunnyvale, CA (US); Fernando Pereira, Palo Alto, CA (US); Hrishikesh Aradhye, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 633 days.

(21) Appl. No.: 15/092,459

(22) Filed: Apr. 6, 2016

(65) Prior Publication Data

US 2016/0299972 A1  Oct. 13, 2016

Related U.S. Application Data

(60) Provisional application No. 62/145,260, filed on Apr. 9, 2015.

(51) Int. Cl.
*G06F 16/00* (2019.01)
*G06F 7/00* (2006.01)
(Continued)

(52) U.S. Cl.
CPC ...... *G06F 16/951* (2019.01); *G06F 16/24534* (2019.01); *G06F 16/24573* (2019.01);
(Continued)

(58) Field of Classification Search
CPC ......... G06F 17/30386; G06F 17/30634; G06F 17/30864; G06F 17/30929; G06F 16/24; G06F 16/33; G06F 16/835; G06F 16/951
(Continued)

(56) References Cited

U.S. PATENT DOCUMENTS

2011/0264656 A1  10/2011  Dumais et al.
2012/0124028 A1*  5/2012  Tullis ..................... G06F 8/60
                                                      707/711
(Continued)

FOREIGN PATENT DOCUMENTS

WO  WO 2014/204699  12/2014

OTHER PUBLICATIONS

Qin et al., "Learning to Rank Relational Objects and Its Application to Web Search," Proceedings of the 17th international conference on World Wide Web (WWW'08), Apr. 21-25, 2008, pp. 407-416.
(Continued)

*Primary Examiner* — Usmaan Saeed
*Assistant Examiner* — Raquel Perez-Arroyo
(74) *Attorney, Agent, or Firm* — Fish & Richardson P.C.

(57) ABSTRACT

Methods, systems, and apparatus, including computer programs encoded on computer storage media, for providing app store search results. An example method includes responsive to a first search query directed to an app store: revising the first search query to produce a second search query different from the first search query; obtaining, from an Internet search engine, second search results responsive to the second search query; analyzing the second search results to identify apps available on the app store that are relevant to the second search query; obtaining, from the app store, first search results responsive to the first search query that identify apps available in the app store; and modifying the first search results based on analyzing the second search results.

15 Claims, 4 Drawing Sheets

(51) Int. Cl.
  *G06F 16/951* (2019.01)
  *H04L 29/08* (2006.01)
  *G06F 16/2453* (2019.01)
  *G06F 16/2457* (2019.01)
  *G06F 16/95* (2019.01)
  *G06F 40/134* (2020.01)

(52) U.S. Cl.
  CPC ............ *G06F 16/95* (2019.01); *G06F 40/134* (2020.01); *H04L 67/02* (2013.01)

(58) Field of Classification Search
  USPC .......................................................... 707/706
  See application file for complete search history.

(56) References Cited

U.S. PATENT DOCUMENTS

| | | | |
|---|---|---|---|
| 2012/0191694 A1* | 7/2012 | Gardiol | G06F 17/2715 707/709 |
| 2012/0240236 A1* | 9/2012 | Wyatt | G06F 21/564 726/25 |
| 2012/0284247 A1* | 11/2012 | Jiang | G06F 16/9535 707/706 |
| 2012/0316955 A1* | 12/2012 | Panguluri | G06Q 30/02 705/14.41 |
| 2012/0323904 A1 | 12/2012 | Qiao | |
| 2013/0290344 A1* | 10/2013 | Glover | G06F 16/24578 707/741 |
| 2014/0108451 A1* | 4/2014 | Lee | G06F 16/951 707/770 |
| 2014/0358916 A1* | 12/2014 | Anand | G06F 16/9535 707/732 |
| 2015/0095319 A1 | 4/2015 | Ormont et al. | |

OTHER PUBLICATIONS

European Search Report in European Application No. 16164096.6, dated Aug. 9, 2016, 9 pages.
Office Action issued in European Application No. 16164096.6, dated Nov. 24, 2017, 5 pages.
'www.microsoft.com' [online] "People," available on or before Aug. 12, 2017 [retrieved on Dec. 20, 2017] Retrieved from Internet URL<https://www.microsoft.com/en-us/research/people/?from=http%3A%2F%2Fresearch.microsoft.com%2Fen-us%2Fpeople%2Fhangli%2Fqin_www_2008.pdf> via the Wayback Machine at URL<https://web.archive.org/web/*/https://www.microsoft.com/en-us/research/people/?from=http%3A%2F%2Fresearch.microsoft.com%2Fen-us%2Fpeople%2Fhangli%2Fqin_www_2008.pdf> 4 pages.
Summons to Attend Oral Proceeding in European Application No. 16164096.6, mailed on Jun. 18, 2018, 9 pages.
Office Action issued in European Application No. 16164096.6, dated Dec. 4, 2018, 47 pages.

* cited by examiner

300

Responsive to identifying a first search query directed to an app store:
302

Revise the first search query to produce a second search query different from the first search query
304

Obtain, from a web page search, second search results responsive to the second search query
306

Analyze the second search results to identify first search terms
308

Identify one or more apps in a response to the user
310

FIG. 3

PROVIDING APP STORE SEARCH RESULTS

CROSS REFERENCE TO RELATED APPLICATION

This application claims priority to U.S. Provisional Application No. 62/145,260, filed on Apr. 9, 2015. The disclosure of the prior application is considered part of and is incorporated by reference in the disclosure of this application.

TECHNICAL FIELD

This specification relates to providing app store search results.

BACKGROUND

Searching for applications on an app store is often limited to information hosted on the app store, although information provided by outside sources, e.g., user reviews published on an external online forum, may be highly relevant.

SUMMARY

In general, this specification describes techniques for improving app store search results using web search results.

In general, one innovative aspect of the subject matter described in this specification can be embodied in methods that include the following actions: responsive to identifying a first search query directed to an app store: revising the first search query to produce a second search query different from the first search query; obtaining, from a web page search, second search results responsive to the second search query; and analyzing the second search results to identify first terms; obtaining, from the app store, first search results in accordance with the first terms.

Other embodiments of this aspect include corresponding computing systems, apparatus, and computer programs recorded on one or more computing storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. Relevant apps can be presented to a user based on information matching an app search that is not hosted on the app store. Information obtained from web pages, for example, may be used to refine app store search results. Apps can be automatically annotated to facilitate future searches. Existing web page annotations, e.g., tags or labels, may be, as part of an app store search process, associated with relevant apps without requiring user intervention.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram illustrating an example process for providing app store search results.

Like reference numbers and designations in the various drawings indicate like elements.

DETAILED DESCRIPTION

An app store, also called an app marketplace, is a type of digital distribution platform for mobile apps, also called applications for mobile devices, e.g., smartphones, laptop computers, and tablet computers. An app provides a specific set of functions, e.g., enabling a user to review a product or providing a map or driving directions. Apps are sometimes programmed to run on specific devices or operating systems or both.

An app store may be an online store that has a graphic user interface (GUI) and a backend database. Through the GUI, users can search for a particular app or browse through different app categories, review information about an app, e.g., a description as well as user reviews and ratings, and acquire the app for free or for a fee, e.g., by downloading the app to one or more mobile devices, either at the time or later. Upon appropriate verification, an app store generally downloads a user-selected app to a user's device, which will install the app on that device.

The technologies described in this specification provide various technical solutions to improve app store search results using web search results by, for example, (1) revising a search query directed to an app store to produce a different search query tailored for web page searches, (2) identifying web pages that match the tailored search query, (3) selecting apps identified in these web pages, and (4) producing search results for the search query executed on the app store that include the selected apps.

For example, after identifying a search query "calendar app" directed to an app store, a search engine rewrites the search query into a different search query "calendar app smartphone type A" and looks for web pages that satisfy the query "calendar app smartphone type A."

Next, based on the returned web pages, the search engine identifies apps that are either mentioned by name in or are linked to these web pages, e.g., "calendar app 1" and "calendar app 2." Then, the search engine can provide app search results based on these identified several apps.

In this way, particularly relevant app search results may be provided without requiring special user effort to find information relevant to an app that is not available in an app store.

Figure 1:
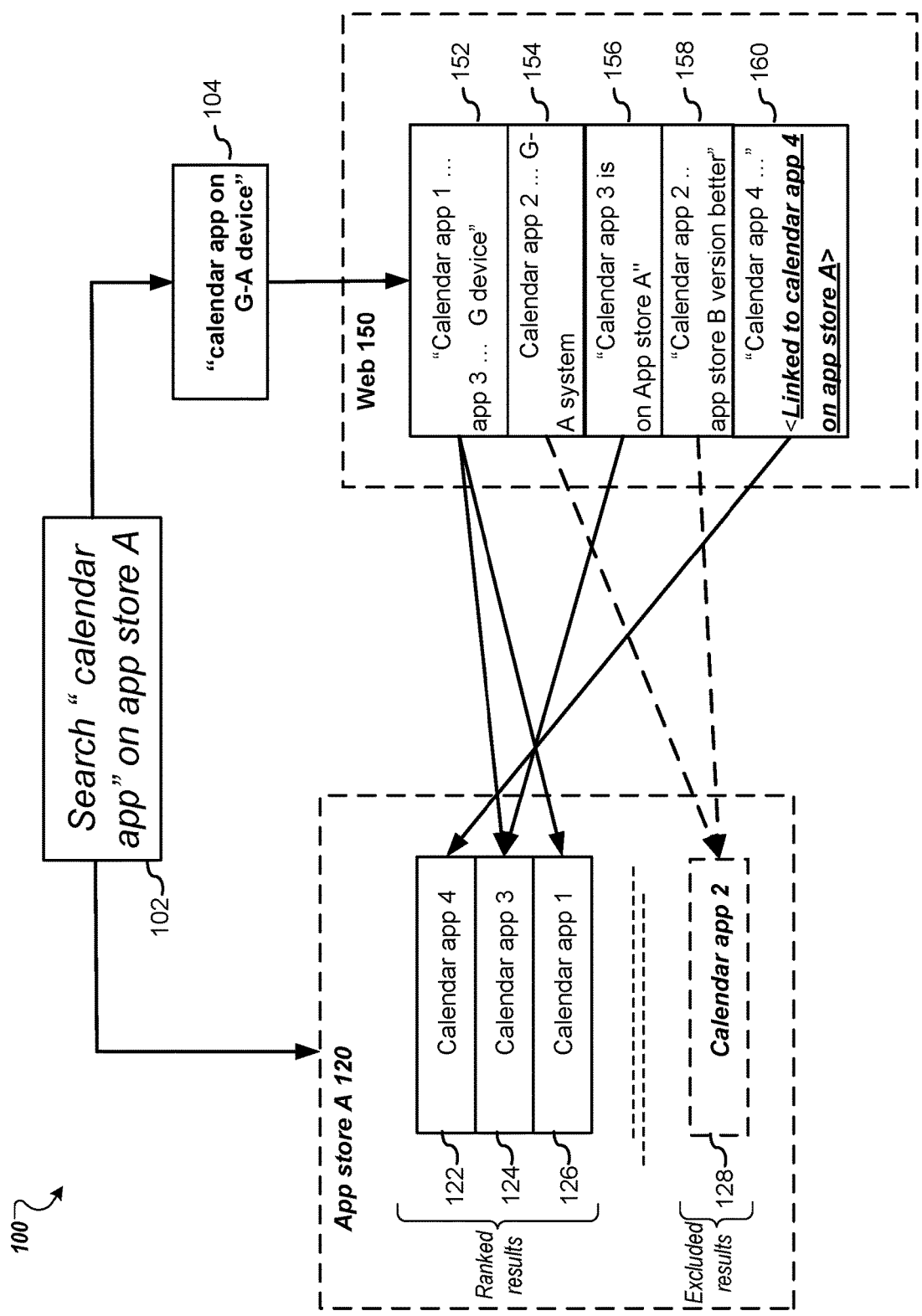
FIG. 1 is a block diagram illustrating an example process for providing app store search results.

FIG. 1 is a block diagram illustrating an example process 100 for providing app store search results.

The process 100 begins when an app store receives a query, which will be referred to as the "app search query," from a user. In the example shown in FIG. 1, a user has entered the query "calendar app" on app store A (102).

An app search engine, which may be part of the app store A or a separate component, begins a web search process by generating a revised search query.

In some implementations, the app search engine generates the revised search query by adding one or more search key terms to the app search query. For example, an app search engine may determine the operating system of a user device from which the search query was issued to be a "G-A" system and thus include the name of the operating system in the web search query, "calendar app on G-A device" (104). Techniques for generating a revised search query are described in more detail in reference to FIG. 2 and FIG. 3.

Next, the app search engine submits the revised search query to an Internet search engine and obtains web pages in response, e.g., by following links in search results provided by the Internet search engine. For example, as shown in FIG. 1, the app search engine obtains five web pages 152-160 for the revised search query 104.

The app search engine next analyzes the content of these web pages to identify relevant apps. In some implementations, app search engine classifies an app as matching an app search query if the app is mentioned in the content of a web page. For example, based on the snippet "Calendar app 1 . . . G device" in the web page 152, the app search engine classifies the calendar app 1 as matching the app search query "calendar app." For another example, based on the snippet "App store A . . . Calendar . . . app 3" in the web page 156, the app search engine classifies the calendar app 3 as matching the app search query "calendar app."

In some implementations, the app search engine performs a link analysis in addition to or in place of a content analysis. In some implementations, upon determining that a web page includes a link to an app available at the app store A, the app search engine classifies the linked app as matching. For example, after determining that web page 160 includes a link to the calendar app 4 on the app store A, the app search engine classifies the calendar app 4 as matching the app search query "calendar app."

After analyzing these web pages, the app search engine identifies a set of apps as matching the app search query.

In some implementations, the app search engine optionally determines a degree of relevance to the app search query for each identified app. In some implementations, the app search engine determines the degree of relevance based on a semantic analysis of the corresponding web page. For example, the app search engine determines the degree of relevance for each identified app in accordance with the meaning of other content in the corresponding of the web page.

For example, based on the snippet "Calendar app 2 . . . app store B version better" in the web page 518, the app search engine classifies the "calendar app 2" as having a lesser degree of relevance: because according to at least some users, the "calendar app 2" offered at the app store A does not function as well ("app store B version better") and should therefore be avoided.

In some implementations, the app search engine classifies an app as having a higher degree of relevance when the app is mentioned in at least a predefined number of web pages that match the revised search query. Similarly, based on the determination that both the web page 152 and web page 156 identify the "calendar app 3," the app search engine may determine that the "calendar app 3" is more relevant to the app search query than the "calendar app 1," which is identified only by a single web page 152.

After analyzing these web pages, the app search engine modifies the identified set of apps in accordance with each app's degree of relevance to the app search query or to the revised search query. For example, the app search engine can rank the apps based on their degrees of relevance and, optionally, the app search engine can exclude an app from being part of the app search results when the app's degree of relevance is lower than a predefined threshold relevance.

For example, as shown in FIG. 1, the app engine ranks the calendar app 4, the calendar app 3, the calendar app 1, in a relevance descending order, based on their respective degrees of relevance and presents them as app search results to the user, i.e., presents app search results identifying those apps to the user. As another example, as shown in FIG. 1, the app engine may exclude the calendar app 2, due to its determined low relevance, from being part of the app search results.

Note that these actions provide, in an app search at an app store, the benefits of a web search, e.g., gathering up-to-date and comprehensive information about an app, without requiring a user to manually or separately conduct the web search and review resulting web pages. These techniques can be particularly advantageous when an app's availability is limited to an app store, but at the same time the app store does not provide desirable information about the app, e.g., the app's functionality and user feedback.

Figure 2:
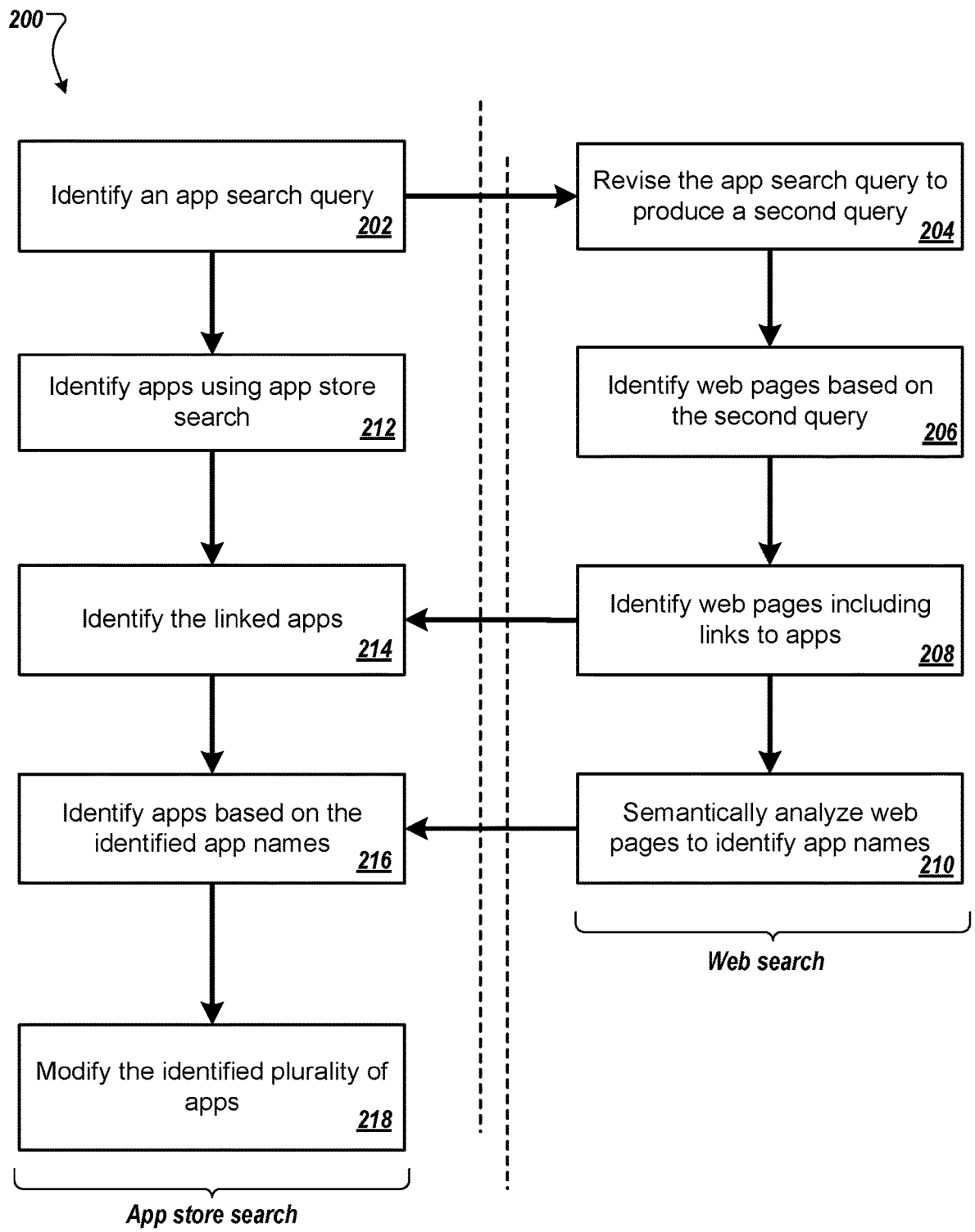
FIG. 2 is a flow diagram illustrating an example process for providing app store search results.

FIG. 2 is a flow diagram illustrating an example process 200 for providing app store search results. For convenience, the process 200 will be described as being performed by a system of one or more computers, located in one or more locations, and programmed appropriately in accordance with this specification. In some implementations, the system is a web search engine.

The system identifies an app search query provided by a user to an app store (step 202). For example, when a user searches an app store on her smartphone, the smartphone submits a web search to the system based on the app search query.

After receiving the app search query, the system generates a second query from the app search query (step 204).

In some implementations, the system revises the first search query by adding a search term to the first search query. The second search query is also referred to in this specification as the revised query. The added search term identifies a characteristic of the app store or a device from which the app search is issued. For example, the added search term can be the name of the app store, the name of the device, or the name of an operating system under which the device operates.

The system then provides the revised query to an Internet search engine to obtain web search results that identify web pages (step 206) and identifies relevant apps by analyzing these web pages.

In some implementations, the system analyzes a web page that include links to apps (step 208) to identify names of apps that may be available on the app store (step 214). For example, as shown in FIG. 1, because the web page 160 includes a user-selectable link to the "calendar 4 app" on the app store A, the system may identify the calendar app 4 as relevant to the first query.

In some implementations, the system semantically analyzes a web page (210) to identify names of apps that may be available on the app store (step 216). For example, as shown in FIG. 1, because the phrase "Calendar app 3 is on App store A"" is present in the web page 156, the system identifies "calendar app 3" as a calendar app available on the app store A and thus relevant to the first query.

In some implementations, when a phrase, e.g., "Calendar app," present in a web page can be interpreted as referring to multiple different apps available on an app store, e.g., the calendar app 2 and the calendar app 3, the system may analyze other content of the web page, e.g., by performing optical character recognition (OCR) on an image in the web page or parsing metadata describing the web page, to determine which one or more apps the web page refers to. For example, if OCR results obtained from an image included in a web page indicates that the image includes the phrase "Calendar app 3," then the system may classify the web page as describing the calendar app 3, but not the calendar app 2, on the app store.

In some implementations, apart from the web search process, the system conducts an app store search, focusing on information stored in the app store. The system may identify apps based on the app store search (step 212). The app store search process can take place before, after, or concurrently with the web search process.

Based on the apps identified in the web search process, the system modifies the apps identified in the app store search process (218) before providing them to a user. For example, the system ranks (or re-ranks) the apps identified in the app store search process based information identified in the web search. For example, the system may rank an app identified in the app store search process low among apps provided to a user, when a web page obtained in the web search process describes the app as "does not function as described."

As another example, the system may exclude an app identified in the app store search process based on information identified by the web search process. For example, the system may withhold an app identified in the app store search process from being presented to a user, when a web page shows a low user rating of the app.

As a third example, the system provides, to a user, apps additional to those identified in the app store search process based on information identified by the web search process. For example, the system may add, to apps obtained in the app store search process, an app that exists on the app store but is identified only by search results in the web search process, when a web page describes the app in a predefined way e.g., as a "must have" or because the web page includes a link to the app on the app store.

FIG. 3 is a flow diagram illustrating an example process 300 for providing app store search results. For convenience, the process 300 will be described as being performed by a system, e.g., a web search engine or an app search engine, implemented on one or more computers in one or more locations.

An app store application installed on a mobile device, e.g., a smartphone, receives a search query from a user.

The app store sends the search query to the search engine and the search engine begins a web search process (step 302).

Before executing a web search, the search engine tailors the app search query to the web search process by revising it (step 304). As described in this specification, the search engine may generate a revised search query by adding, removing, or replacing search terms in the app search query. For example, if an app search query "calendar app" was issued through an app store A on a smartphone B, the search engine may revise the app search query by adding the name of the app store and the name of the smartphone to the original app search query, "calendar app on smartphone B at app store A."

The search engine then executes the revised app search query to perform a web search and obtains relevant web search results (step 306). As described at least with reference to FIG. 2, the search engine analyzes the web search results, e.g., either semantically, structurally, or both, to identify apps that may be relevant to the app search query (step 308).

For example, upon determining that a web page includes a link to a "calendar 4 app" on the app store A, the search engine may classify the "calendar 4 app" as highly relevant to the app search query "calendar app." Because providing, in a web page, a direct link to an app may suggest that the app is highly pertinent to the content of the web page.

For another example, upon determining that a predefined number, e.g., 4 or more, of web pages include the phrase "calendar 2 app," which is the name of an app available on the app store, the search engine may classify the "calendar 2 app" as highly relevant to the app search query "calendar app" because being mentioned in a relatively large number of web pages may indicate that an app is widely recognized as relevant and useful.

For a third example, upon determining that a web page includes the phrase "calendar 2 app" and the phrase "not good" within the same sentence, the search engine may classify the "calendar 2 app" as irrelevant to the app search query "calendar app." This content analysis is advantageous, because it can provide more than facially relevant app search results. In other words, apps are examined substantively, e.g., in terms of functionality and user feedback, before being provided, as part of search results, to a user.

In some implementations, the search engine also searches the app store using the app search query to identify relevant apps. For example, after receiving the app search query "calendar app," the search engine obtains app store search results and identifies one or more apps on based on the app store search results.

Based on apps identified from the web search results and optionally those identified from the app search results, the search engine selectively identifies one or more apps in a response to the user (step 310). For example, an app identified in the app search results can be removed as irrelevant based on the description of that app in a web page. For example, an app not identified in the app search results, but identified in the web search results can be provided to a user as relevant. For another example, an app identified in the app search results may be ranked low on the list of apps provided to a user, based on the negative description of that app in a web page.

In some implementations, the search engine forwards content or metadata of a web page to the app store, and the app store annotates the corresponding app based on the content or metadata.

For example, when an app offered as part of the app search results to a user is described in a web page as "not only the best calendar app, but also the coolest alarm app," the app store annotates the app as a "calendar app" as well as an "alarm app."

The search engine can use these app annotations to improve app search results in the future, for example, based on the following algorithm: an app store may classify an app as matching an app search query, when the annotation associated with the app matches at least one search term in the app search query. These techniques are advantageous, as they enable app annotation without requiring either manual user effort or a separate annotation process: web page annotations based on web page content or metadata are automatically applied to relevant apps as part of an app search process.

In some implementations, the system can pre-generate app search results offline for predefined queries, e.g., popular queries that are issued more than a predefined number of times over a predefined time period, and serve the app search results to a user faster.

For example, the app search engine can identify a set of popular app search queries, e.g., queries that are issued more than 5 times in the past 2 hours by different users. The system can identify matching apps using the search processes described in this specification and cache these app search results in anticipation of these search queries or their equivalents being issued again, e.g., by the same or different users. These techniques may be advantageous, as they can reduce response time needed to generate app search results. For example, after obtaining an app search query, the system can skip the steps 204, 206, 208, and 210 described in FIG. 2 and provide pre-generated app search results to a user.

Figure 4:
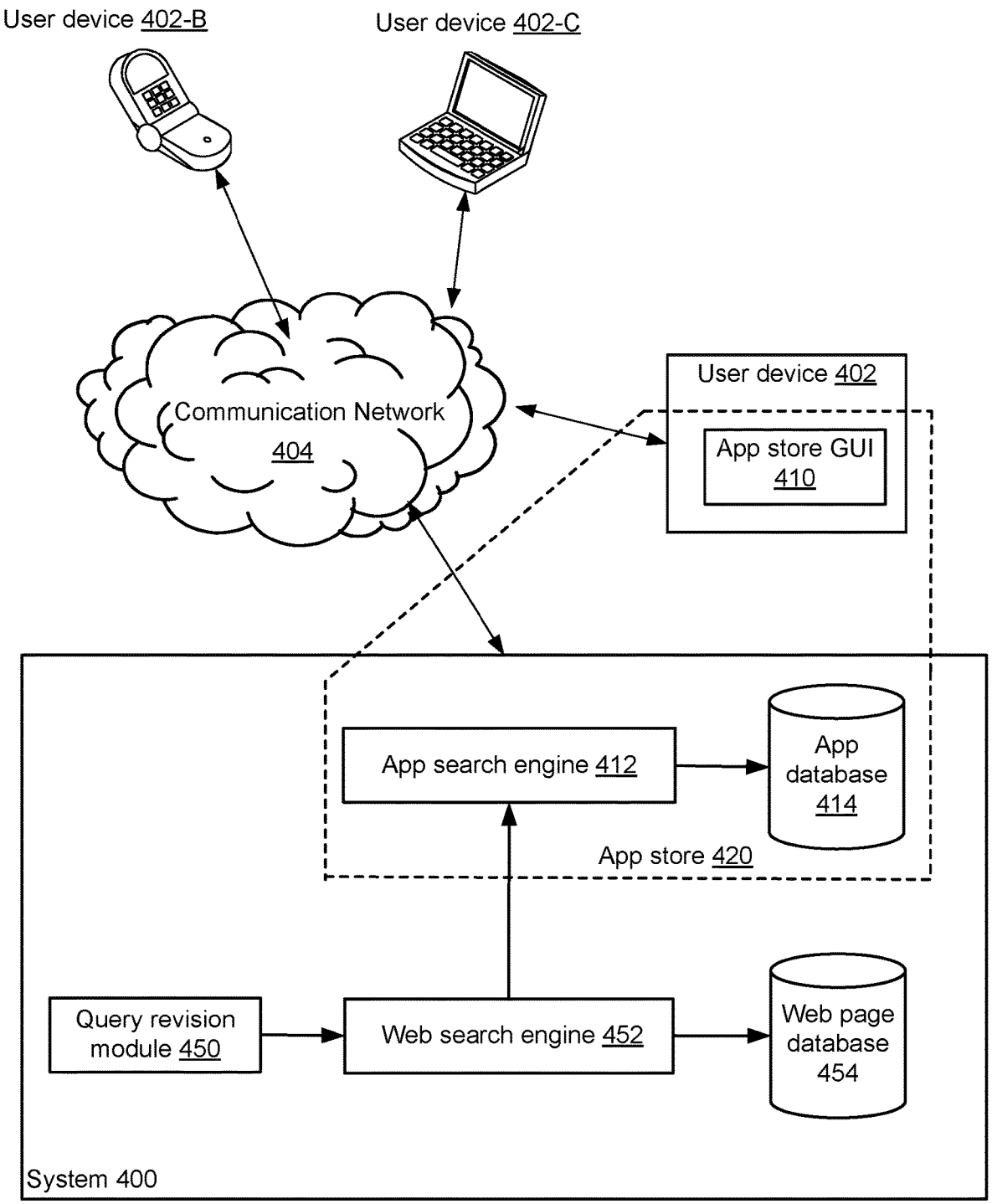
FIG. 4 is a block diagram of an example computing system for providing app store search results.

FIG. 4 is a block diagram of an example computing system 400 that implements app store technology described in this specification. The system 400 is connected with one or more user devices 402 through a communication network 404. The system 400 is implemented on one or more computers at one or more locations, each of which has one or more processors and memory for storing instructions executable by the one or more processors.

A user device 402 provides a GUI 410 of an app store 420 hosted on the system 400. In some implementations, the GUI is implemented in an app previously installed on the user device. The app store GUI 410 receives app search queries provided by a user through the GUI and causes the app search engine 412 and the web search engine 452 in the system 400 to identify matching apps and web documents referring to the matching apps, respectively. A user device may be, for example, a mobile device, e.g., a laptop 420-C, a smartphone 420-B, or a tablet computer.

The communication network 404 provides communications and data transfers between a user device 402 and the system 400. The communication network 404 generally includes a local area network (LAN) or a wide area network (WAN), e.g., the Internet, and may include both.

The system 400 provides, to a user device 102, app search results responsive to an app search query. The system 400 includes a query revision module 450, a web search engine 452, a web page database 454, an app search engine 412, and an app database 414. The app store 420 includes the GUI 410, the app search engine 412, and the app database 414. The app database 414 includes a collection of apps, as well as data about the apps.

The query revision module 450 generates a revised search query for an app search query and sends the revised search query to the web search engine 452 to obtain matching web pages.

The web search engine 452 is a web search engine. In response to the app search engine, the web search engine executes web searches based on a revised search query against the web page database 454 to obtain matching web pages. The web search engine 452 also provides information identified in web search results, e.g., app names or links, to the app search engine 412.

All of the operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system comprising:
one or more computers; and
one or more storage devices storing instructions that when executed by the one or more computers cause the one or more computers to perform operations comprising:
responsive to an app search engine of an app store receiving, from a mobile device, a first search query that is directed to the app store:
revising, by the app search engine of the app store, the first search query that is directed to the app store to produce a second search query that is different from the first search query, for submission to an Internet search engine that is different than the app search engine and that returns matching web pages in response to search queries, comprising adding one or more terms that identify the app store associated with the app search engine to the first search query;
submitting, by the app search engine of the app store, the second search query that includes the one or more terms that identify the app store to the Internet search engine that is different than the app search engine;
obtaining, by the app search engine and from the Internet search engine, second search results in response to the second search query, each second search result identifying a respective web page that matches the second search query that includes the one or more terms that identify the app store;
analyzing, by the app search engine, the respective web pages identified by the second search results obtained by the Internet search engine to identify apps that are available on the app store that are relevant to the second search query that includes the one or more terms that identify the app store;
obtaining, from the app search engine of the app store, first search results responsive to the first search query that identify apps that are available in the app store;
modifying, by the app search engine, the first search results obtained from the app search engine of the app store based on the apps identified by analyzing the respective web pages identified by the second search results obtained from the Internet search engine; and
providing, by the app search engine, the modified first search results for presentation on the mobile device.

2. The system of claim 1, the operations further comprising:
annotating the first search results with terms appearing in the web pages identified by the second search results.

3. The system of claim 1, wherein analyzing the respective web pages identified by the second search results to identify apps available on the app store that are relevant to the second search query comprises:
semantically analyzing the respective web pages to identify one or more candidate names of apps.

4. The system of claim 1, wherein analyzing the respective web pages identified by the second search results to identify apps available on the app store that are relevant to the second search query comprises:
identifying, in the respective web pages, one or more links to applications in the app store.

5. The system of claim 1, wherein the one or more terms that identify the app store include a name of the app store.

6. The system of claim 1, wherein modifying the first search results based on the apps identified by analyzing the respective web pages identified by the second search results comprises:
removing a search result from the first search results based on analyzing the respective web pages identified by the second search results.

7. The system of claim 1, wherein modifying the first search results based on the apps identified by analyzing the respective web pages identified by the second search results comprises:
ranking the first search results based on analyzing the respective web pages identified by the second search results.

8. A method comprising:
responsive to an app search engine of an app store receiving, from a mobile device, a first search query that is directed to the app store:
revising, by the app search engine of the app store, the first search query that is directed to the app store to produce a second search query that is different from the first search query, for submission to an Internet search engine that is different than the app search engine and that returns matching web pages in response to search queries, comprising adding one or more terms that identify the app store associated with the app search engine to the first search query;
submitting, by the app search engine of the app store, the second search query that includes the one or more terms that identify the app store to the Internet search engine that is different than the app search engine;
obtaining, by the app search engine and from the Internet search engine, second search results in response to the second search query, each second search result identifying a respective web page that matches the second search query that includes the one or more terms that identify the app store;
analyzing, by the app search engine, the respective web pages identified by the second search results obtained by the Internet search engine to identify apps that are available on the app store that are relevant to the second search query that includes the one or more terms that identify the app store;
obtaining, from the app search engine of the app store, first search results responsive to the first search query that identify apps that are available in the app store;
modifying, by the app search engine, the first search results obtained from the app search engine of the app store based on the apps identified by analyzing the respective web pages identified by the second search results obtained from the Internet search engine; and
providing, by the app search engine, the modified first search results for presentation on the mobile device.

9. The method of claim 8, further comprising: annotating the first search results with terms appearing in the respective web pages.

10. The method of claim 8, wherein analyzing the respective web pages identified by the second search results to identify apps available on the app store that are relevant to the second search query comprises:
semantically analyzing the respective web pages to identify one or more candidate names of apps.

11. The method of claim 8, wherein analyzing the respective web pages identified by the second search results to identify apps available on the app store that are relevant to the second search query comprises:
identifying, in the respective web pages, one or more links to applications in the app store.

12. The method of claim 8, wherein the one or more terms that identify the app store include a name of the app store.

13. The method of claim 8, wherein modifying the first search results based on the apps identified by analyzing the respective web pages identified by the second search results comprises:
removing a search result from the first search results based on analyzing the respective web pages identified by the second search results.

14. The method of claim 8, wherein modifying the first search results based on the apps identified by analyzing the respective web pages identified by the second search results comprises:
ranking the first search results based on analyzing the respective web pages identified by the second search results.

15. One or more non-transitory computer storage media encoded with a computer program, the computer program comprising instructions that when executed by one or more computers cause the one or more computers to perform operations comprising:
responsive to an app search engine of an app store receiving, from a mobile device, a first search query that is directed to the app store:
revising, by the app search engine of the app store, the first search query that is directed to the app store to produce a second search query that is different from the first search query, for submission to an Internet search engine that is different than the app search engine and that returns matching web pages in response to search queries, comprising adding one or more terms that identify the app store associated with the app search engine to the first search query;
submitting, by the app search engine of the app store, the second search query that includes the one or more terms that identify the app store to the Internet search engine that is different than the app search engine;
obtaining, by the app search engine and from the Internet search engine, second search results in response to the second search query, each second search result identifying a respective web page that matches the second search query that includes the one or more terms that identify the app store;
analyzing, by the app search engine, the respective web pages identified by the second search results obtained by the Internet search engine to identify apps that are available on the app store that are relevant to the second search query that includes the one or more terms that identify the app store;
obtaining, from the app search engine of the app store, first search results responsive to the first search query that identify apps that are available in the app store;
modifying, by the app search engine, the first search results obtained from the app search engine of the app store based on the apps identified by analyzing the respective web pages identified by the second search results obtained from the Internet search engine; and
providing, by the app search engine, the modified first search results for presentation on the mobile device.

* * * * *

UNITED STATES PATENT AND TRADEMARK OFFICE
CERTIFICATE OF CORRECTION

PATENT NO. : 10,635,725 B2
APPLICATION NO. : 15/092459
DATED : April 28, 2020
INVENTOR(S) : Samdani et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this
Thirteenth Day of December, 2022

Katherine Kelly Vidal
*Director of the United States Patent and Trademark Office*